United States Patent [19]

O'Neill

[11] Patent Number: 5,395,244

[45] Date of Patent: Mar. 7, 1995

[54] EDUCATIONAL APPARATUS FOR PROVIDING CORRELATIONS ESPECIALLY BETWEEN BOTANY, GEOGRAPHY AND HISTORY

[76] Inventor: John O'Neill, P.O. Box 1224, Occidental, Calif. 95465-1224

[21] Appl. No.: 27,022

[22] Filed: Mar. 5, 1993

[51] Int. Cl.⁶ .............................................. G09B 25/06
[52] U.S. Cl. .................................. 434/151; 434/131; 434/295; 47/66
[58] Field of Search ................ 434/295, 131, 132, 133, 434/150, 151, 152, 153; 47/66

[56] References Cited

U.S. PATENT DOCUMENTS

| | | | |
|---|---|---|---|
| 641,283 | 1/1900 | Evans | 434/151 X |
| 1,668,569 | 5/1928 | Murry | 434/150 |
| 2,233,032 | 2/1941 | Robinson | 47/66 |
| 4,103,436 | 8/1978 | Strussion et al. | 434/151 |
| 4,115,930 | 9/1978 | Beck | 434/151 X |
| 4,163,343 | 8/1979 | Schoenfield | 47/66 |
| 4,494,935 | 1/1985 | Miller | 434/132 |

FOREIGN PATENT DOCUMENTS

2727163  12/1978  Germany ............................ 47/66 C

*Primary Examiner*—Gene Mancene
*Assistant Examiner*—Jeffrey A. Smith
*Attorney, Agent, or Firm*—Bernhard Kreten

[57] ABSTRACT

The subject invention provides for an educational device for teaching concepts of geography and biology (including ecology). The subject invention comprises a plant growth chamber in which any of a variety of plants may be grown. Covering the plant growth chamber is a plant growth limitation shield having at least one opening. The top surface of the plant growth limitation shield contains an illustration in which the aperture (or apertures) forms a part of the illustration. The subject device also comprises means for holding the plant growth limitation shield in place over the plant growth chamber such that plants growing from the plant growth chamber may grow through the aperture (or apertures) of the plant growth limitation shield and that the plant growth limitation shield is held in fixed position relative to the plant growth chamber. A variety of illustrations may be present on the top surface of the plant growth limitation shield, preferred illustrations include land masses such as countries or continents, flora, fauna, ethnic symbols, points of interest e.g. historical sites in which the aperture (or apertures) form areas of the land mass known to contain large amounts of vegetation, e.g. rain forests.

8 Claims, 9 Drawing Sheets

EDUCATIONAL APPARATUS FOR PROVIDING CORRELATIONS ESPECIALLY BETWEEN BOTANY, GEOGRAPHY AND HISTORY

FIELD OF THE INVENTION

The present invention is related to the field of educational devices in general, and the field of educational devices employing plant growth in particular.

BACKGROUND OF THE INVENTION

It is well known that it is difficult to teach both children and adults the subjects of geography and biology. It is thus of interest to provide devices for teaching geographic and biological concepts with tangible examples of some of the concepts sought to be conveyed to the student.

It is of interest to provide a device for teaching geography and biology (including ecology) in which plant growth is used to reinforce the educational concept sought to be conveyed. The growth of the plants may serve to reinforce the educational concept sought to be conveyed by providing a visual, olefactory and tactile association between living things, i.e. plants, and the educational concept of interest. Of particular interest are devices that may be able to provide for the representation of a wide variety of educational concepts and for the use of a wide variety of plants.

Ornamental devices, commercially known as Chia animals, consist of clay figurines portraying animals or humans in which seeds of small plants are embedded in the clay so as to provide for the "humorous" illusion of small green plants growing where hair, fur, or wool would be found on the creature represented by the figurine. Such figurines are highly limited with respect to portraying items of geographical interest and the plants that may be used in conjunction with the figurine.

The following prior art reflects the state of the art of which applicant is aware and is included herewith to discharge applicant's acknowledged duty to disclose relevant prior art. It is stipulated, however, that none of these references teach singly nor render obvious when considered in any conceivable combination the nexus of the instant invention as disclosed in greater detail hereinafter and as particularly claimed.

SUMMARY AND OBJECTS OF THE INVENTION

As one primary object, the subject invention provides an educational device for teaching concepts of geography and biology (including ecology). The subject invention comprises a plant growth chamber in which any of a variety of plants may be grown. Covering the plant growth chamber is a plant growth limitation shield having at least one opening. The top surface of the plant growth limitation shield contains an illustration in which the opening (or openings) forms a part of the illustration. The subject device also comprises means for holding the plant growth limitation shield in place over the plant growth chamber such that plants growing from the plant growth chamber may grow through the opening(s) of the plant growth limitation shield and that the plant growth limitation shield is held in fixed position relative to the plant growth chamber. A variety of illustrations may be present on the top surface of the plant growth limitation shield, preferred illustrations include land masses such as countries or continents, in which the opening(s) form areas of the land mass known to contain large amounts of vegetation, e.g. rain forests.

Collectively the shield and chamber can be integrally formed having a plan view (e.g. silhouette) correlative of a geographical area. The opening would be located on the shield and/or profiled to impart further information instructive of that geographical area.

DESCRIPTION OF PREFERRED EMBODIMENTS

Figure 1:
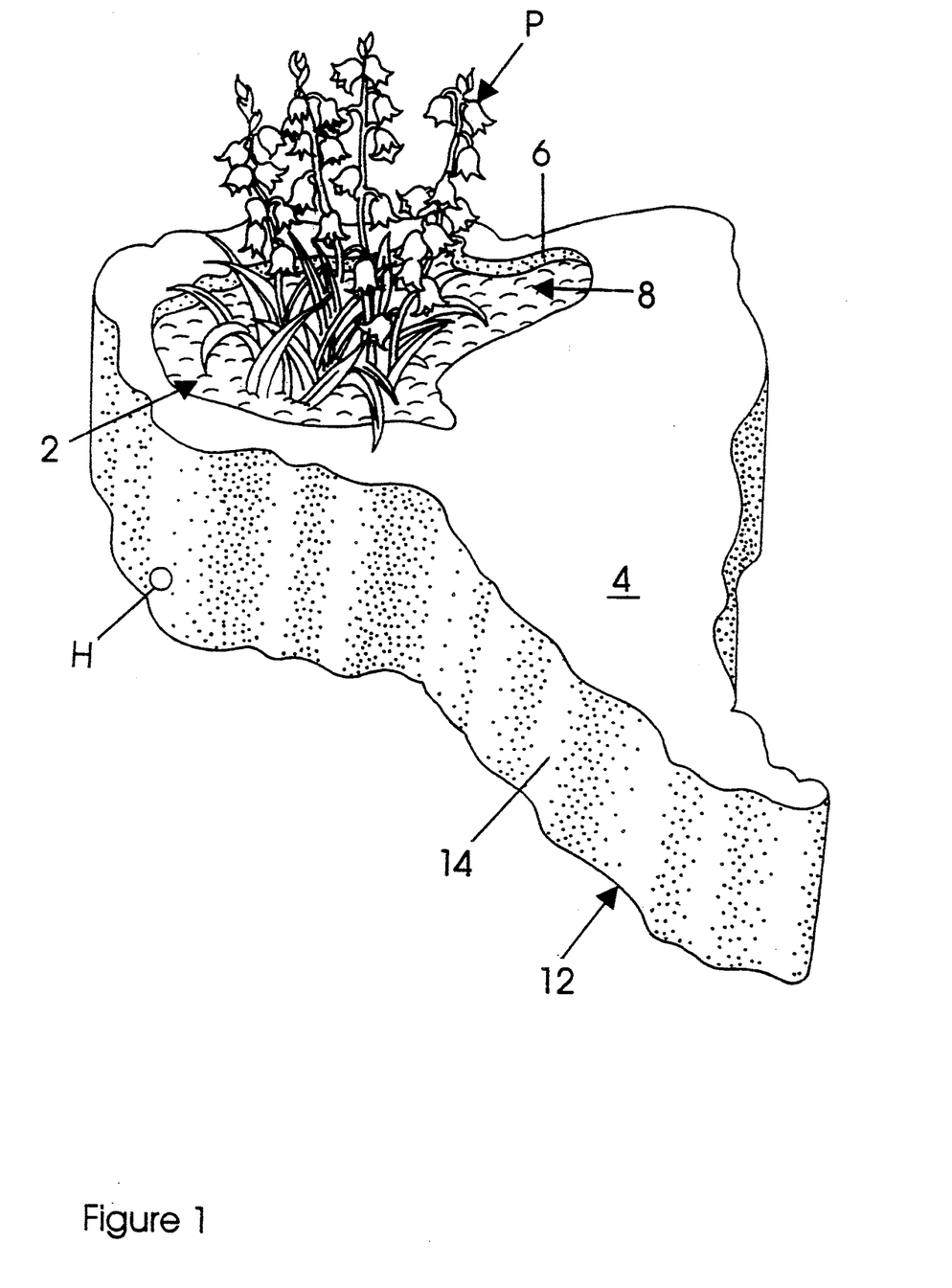
FIG. 1 is a perspective view of the invention in one form.
Figure 2:
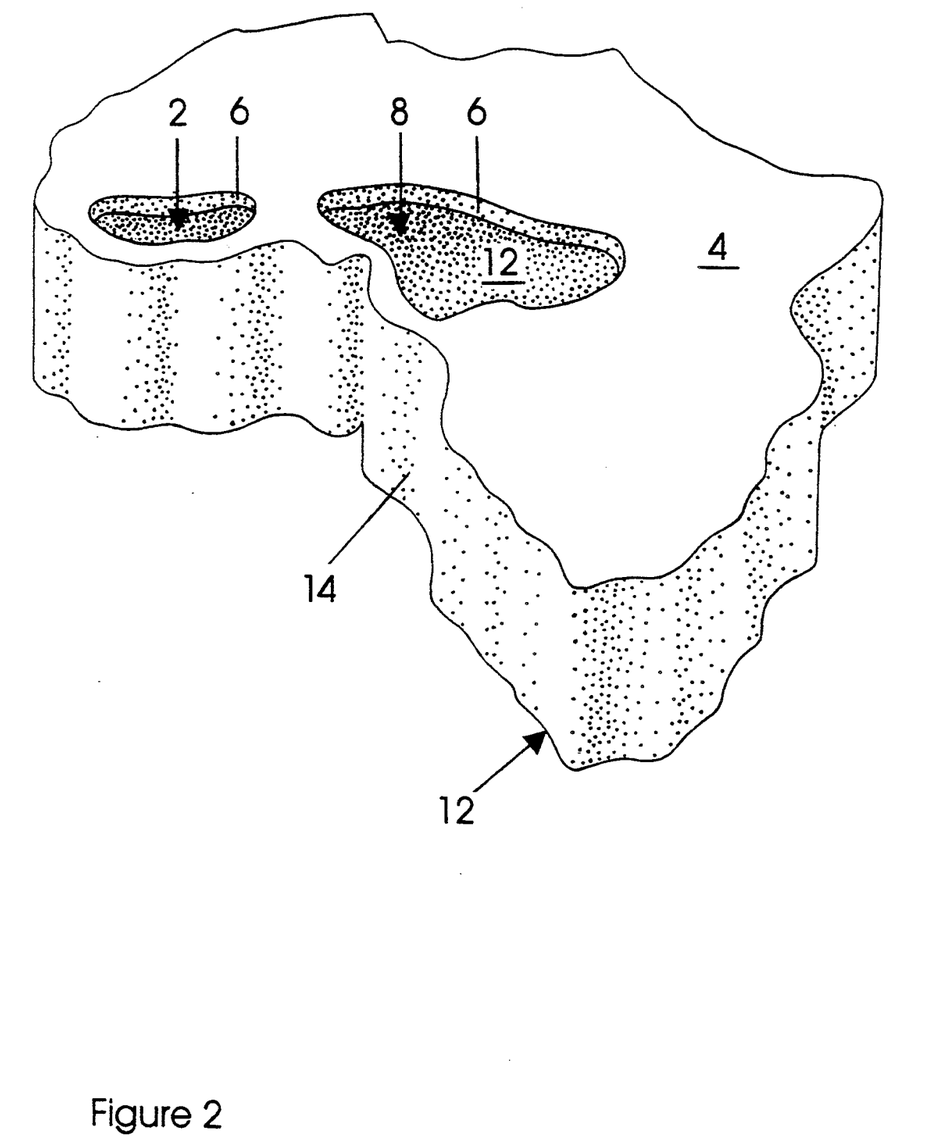
FIG. 2 is a perspective view of the invention in another form.

The subject invention shown in FIGS. 1 and 2 comprises a plant growth chamber 2 and a plant growth limitation shield 4 positioned above the chamber 2, wherein the top of the plant growth limitation shield 4 contains an illustration having at least one opening 6 or aperture, i.e. a hole. FIG. 2 shows two openings 6. Plants growing out of the plant growth chamber 2 and through the openings 6 in the plant growth limitation shield 4 serve to complete the image on the plant growth limitation shield by filling in at least part of the opening 6. Thus plants growing in the plant chamber, by completing the illustration on the plant growth limitation shield, may reinforce an association, in the minds of those seeing, smelling, tasting and/or feeling the subject invention, between living things and the place represented by the illustration on the plant growth limitation shield 4 portion of the subject invention.

Figure 6:
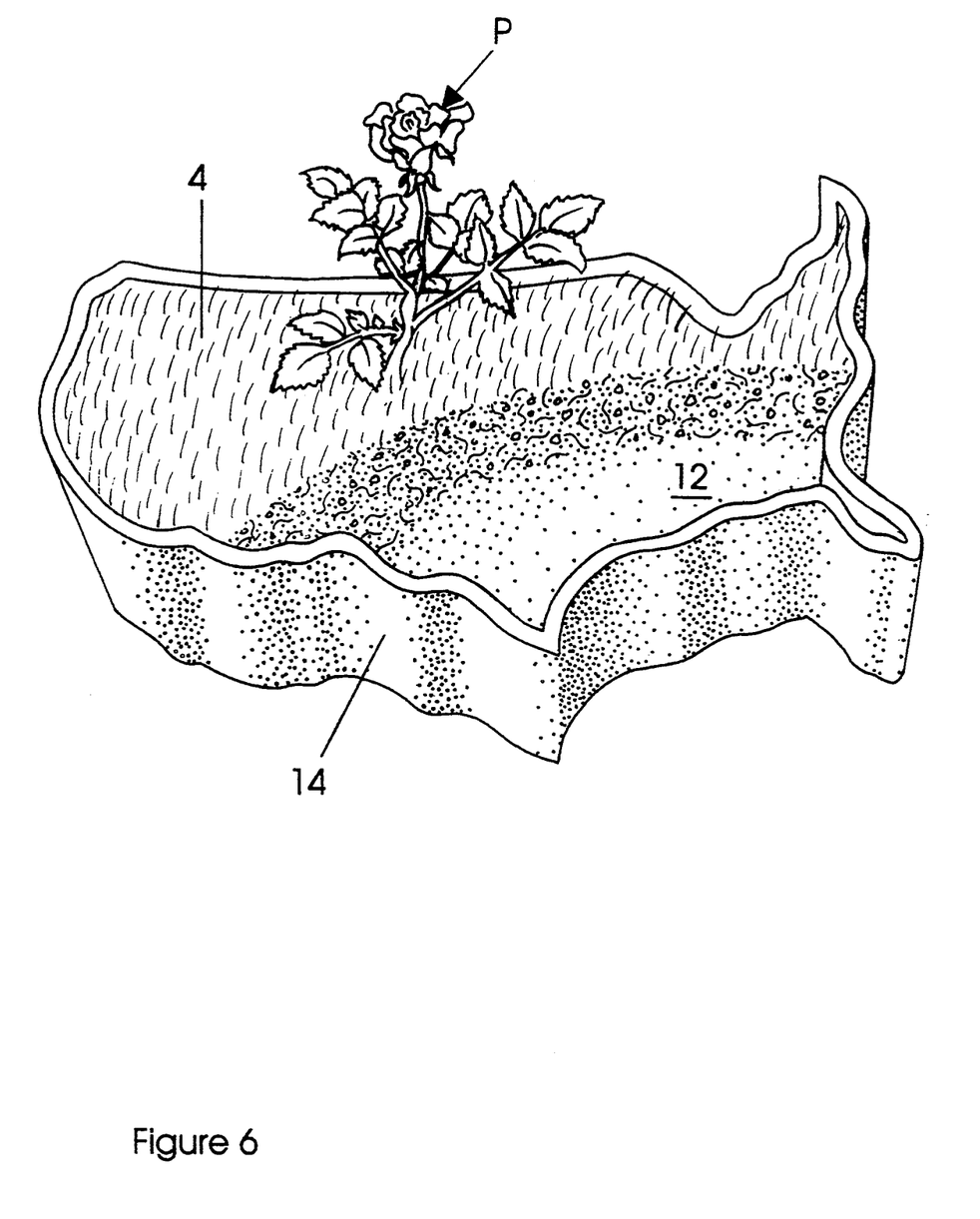
FIG. 6 is a perspective view of the invention in a sixth form.

The plant growth chamber of the subject invention is of a shape capable of holding plant growth media such as soil, hydroponic solution, and the like. Thus the plant growth chamber 2 comprises a cavity 8 for holding plant growth media. Typically, the plant growth chamber has a substantially flat base 12, having raised sides 14 to contain the plant growth media, and may have an open top to provide room for the growth of plants rooted in plant growth media contained in the plant growth chamber. FIG. 6 reflects such an "open-top" construct. The "shield" 4 of FIG. 6 would be a cover crop such as a dense grass mat. The opening 6 would parallel where a different plant P protrudes from the grass mat. The location and type of plant P could correlate with a "micro-geographical" correlative. For example, a corn seedling could emanate from a corn producing region such as Iowa or Nebraska. Other probes such as small states could be located on a map for showing other locales such as cities.

Figure 3:
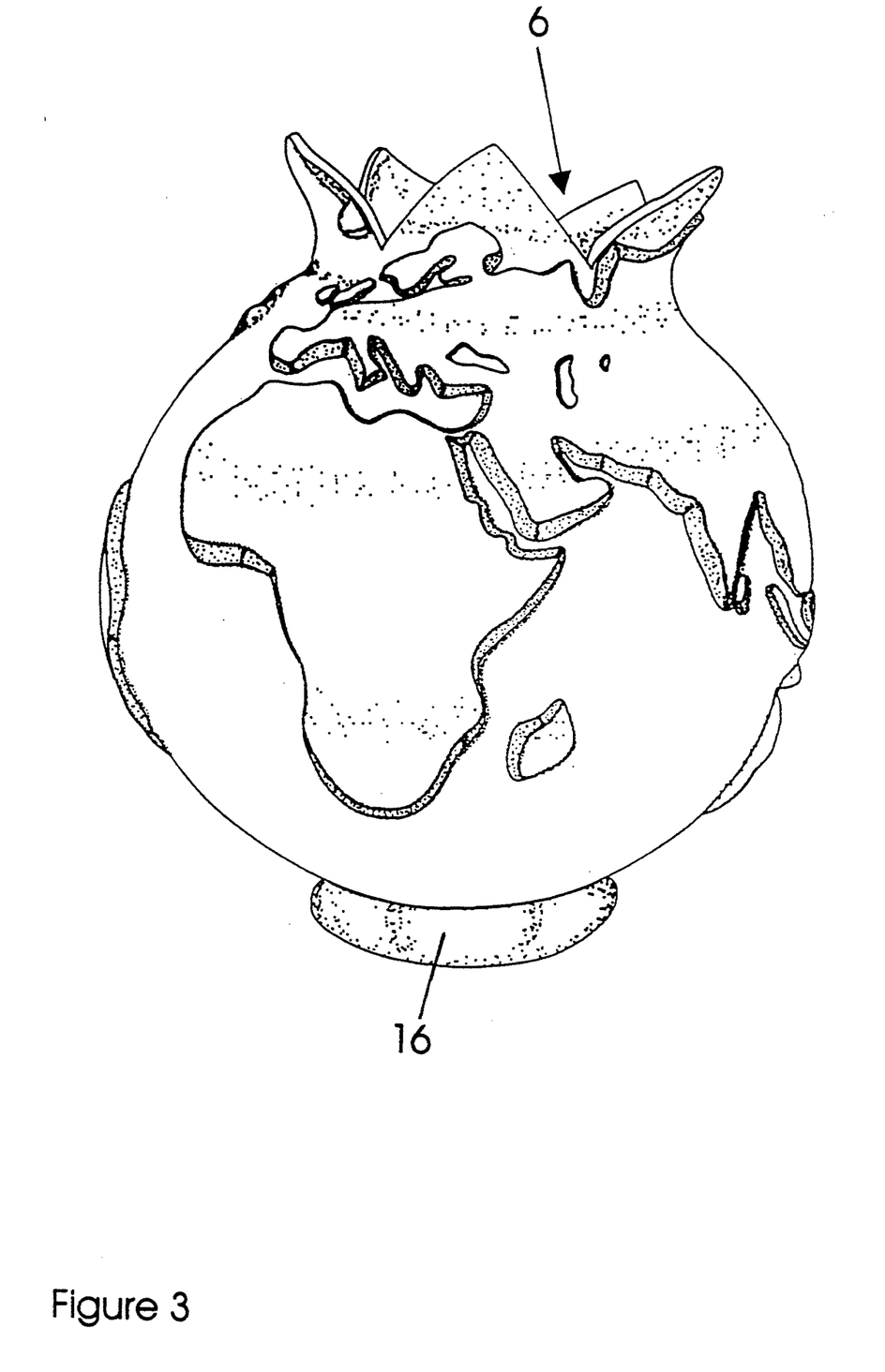
FIG. 3 is a perspective view of the invention in a third form.

The plant growth chamber, while preferably defining a substantially flat-shaped hollow volume, may be circumscribed by side walls having a variety of shapes, either regular or irregular. One shape for the plant growth chamber is substantially oval, rounded or globe-shaped. A globe is depicted in FIG. 3.

The plant growth chamber may be of a variety of materials including wood, metal or plastic. Preferred materials for construction of the plant growth chamber are substantially water impermeable.

When typical plant husbandry container materials are used, such as terra cotta, one surface can be glazed to control moisture migration and/or leaching of minerals or salts from the terra cotta.

Figure 4:
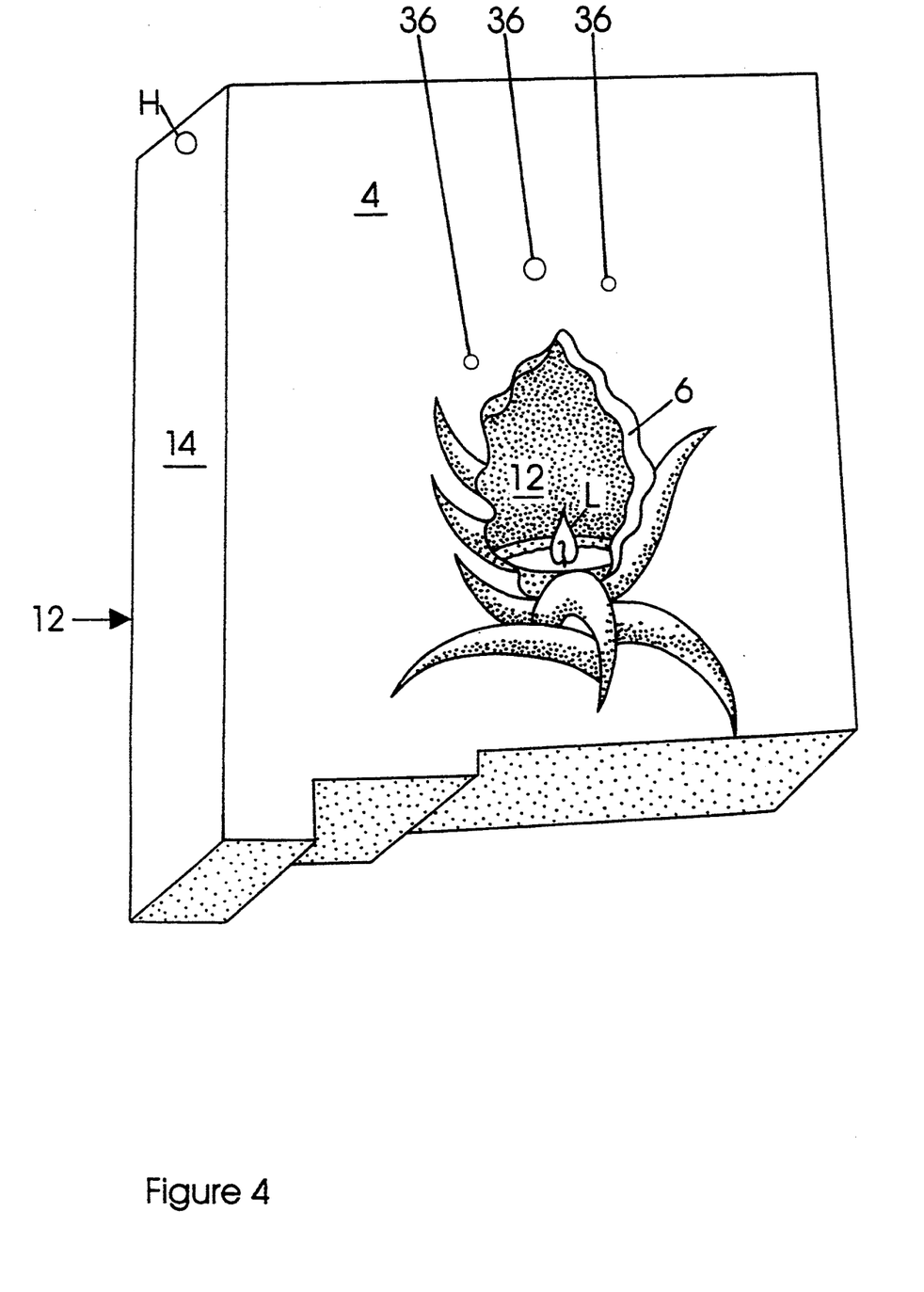
FIG. 4 is a perspective view of the invention in a fourth form.

As shown in FIGS. 1, 2, 4 and 5, the subject invention further comprises a plant growth limitation shield 4. The plant growth limitation shield 4 may be substantially planar in shape; however, plant growth limitation shields may be curved to some extent. FIG. 3 reflects a globe where the transition from the base to side sidewalls to shield are of constant radius. Plant growth limitation shields may be of a variety of shapes. Generally, the outer perimeter of the plant growth limitation shield may be of a shape similar to the shape of the perimeter of the plant growth chamber of the subject invention. The plant growth shield is preferably the same size as the plant growth chamber but could be larger than the chamber 2. The plant growth shield has a top and bottom surface. The top surface of the plant growth shield may include at least one illustration. The plant growth shield further comprises at least one opening 6, i.e. an aperture or a hole, such that the opening forms a part of the illustration on the plant growth limitation shield. For example, FIG. 4 shows small and large openings 6. The plant growth limitation shield may be of a variety of materials suitable for permitting a permanent rendering of an illustration. Suitable materials for the plant growth limitation shield 4 may include paper, ceramic, plastic and the like. Generally, the plant growth limitation shield will be of the same material as the base and sidewalls and is relatively rigid. Preferably, the plant growth shield is integrally formed with the growth chamber of the subject invention.

The illustration on the top surface of the plant growth limitation shield may be of a variety of subjects. These subjects for the illustrations typically can fall into at least one of three education categories: (1) outlines of land masses such as countries (e.g. FIG. 6), continents (e.g. FIGS. 1 and 2), islands, sub-regions of countries (e.g. FIGS. 4 and 5) and the like; (2) symbols and plant life and (3) animals. Of particular interest are illustrations of category (1), i.e. land masses.

It is of interest to provide illustrations of land masses such that the opening(s) 6 in the plant growth limitation shield 4 forms an integral part of the illustration. For example, the illustration may be of a continent such as South America (FIG. 1) or Africa (FIG. 2) in which the openings 6 in the plant growth shields 4 are located at regions of the illustration corresponding to rain forests such as the Amazon basin or other regions of specialized vegetation.

Additionally, when the illustration is of a land mass, the opening 6 of the plant growth limitation shield 4 can be of a shape corresponding to a particular land mass, for example, the aperture may be in the shape of a particular land mass or country, e.g. England, the state of Hawaii. FIG. 3 reflects an opening 6 where the Arctic region has been "peeled open" providing access to the core of the earth about its axis of precession. The Antarctic region is supported on a pedestal 16.

Figure 5:
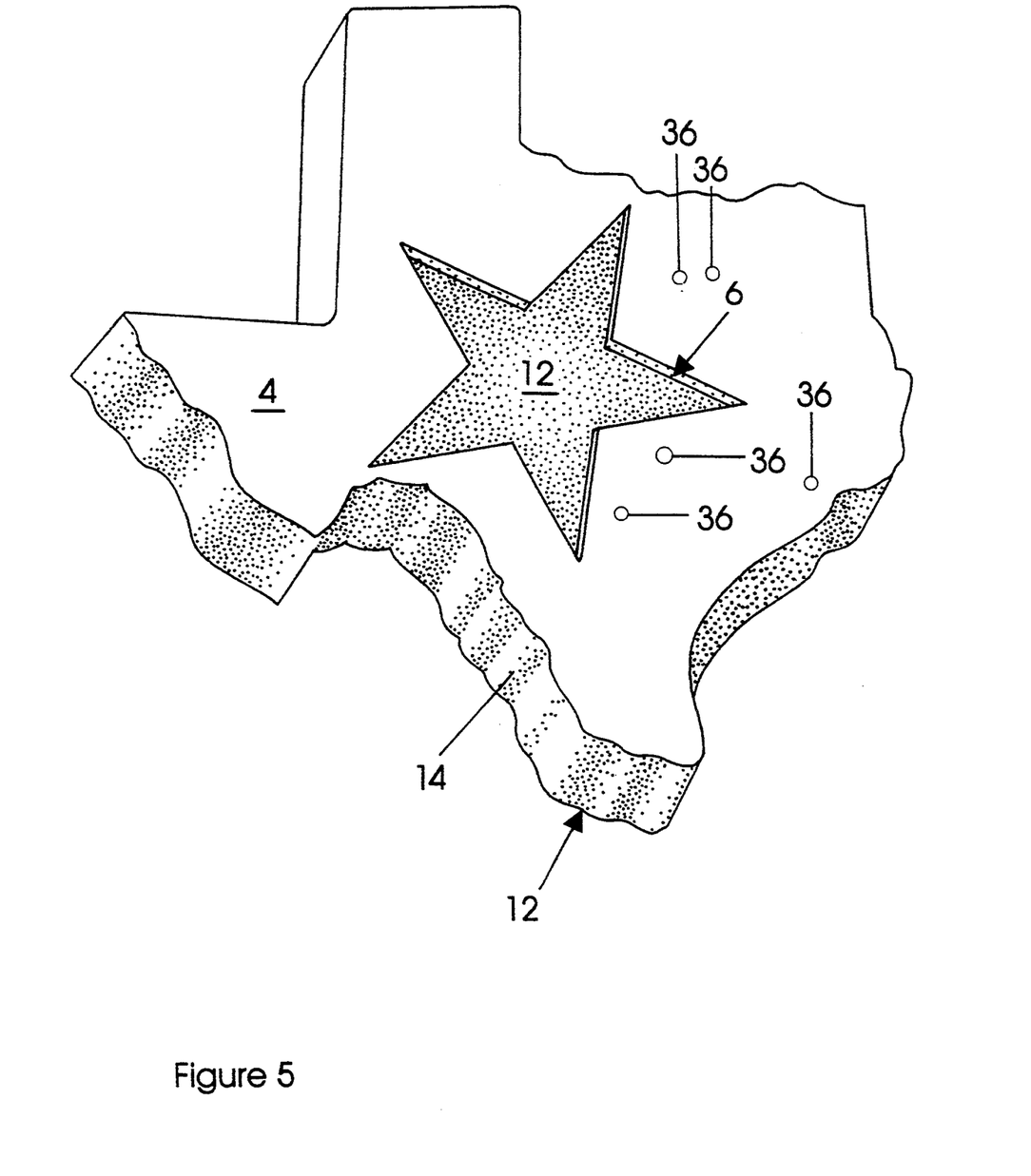
FIG. 5 is a perspective view of the invention in a fifth form.

When the illustration on the plant growth limitation shield is representational of an animal, the aperture on the plant growth limitation shield may correspond to regions of the animal producing hair, fur, feathers and the like. For example, apertures or plant growth limitation shields 4 containing illustrations of humans may correspond to hair on the head, or other regions of the body. Similarly, representations of animals may contain apertures corresponding to particular regions of the animals' body covering, e.g. the apertures may correspond to the black stripes on a zebra. Additionally, the illustrations of the subject invention may contain openings 6 representational of vegetation. For example, FIG. 4 depicts the state of New Mexico and the state flower, the Yucca plant. Dots 36 reflect major cities; the largest dot reflecting the state capitol. The rest of the illustration may comprise one or more animals living among the vegetation, e.g. the illustration may be of a bird and the opening's illustration may correspond to vegetation over which the bird is flying. FIG. 4 reflects a candle supported in the opening 6, perhaps on sand. FIG. 5 reflects the state of Texas and its logo, the "Lone Star", defines the opening 6.

As mentioned, an illustration may be formed on the shield by any of a variety of methods, including printing or molding (including 3-dimensional molding). The illustration may thus have 3-dimensional elements. The illustration on the plant growth limitation shield 4 may be of one or more colors.

The subject invention further comprises means for holding the plant growth limitation shield 4 in a fixed position relative to the plant growth chamber 2, so as to keep the bottom surface of the plant growth limitation shield 4 facing the plant growth chamber 2 and the illustration on the top of the plant growth limitation shield facing observers, i.e. on top. Means for holding the plant growth limitation shield in place may include one or more posts joining the plant growth limitation shield to the plant growth chamber at its juncture with sidewalls 14 or by direct coupling by reversible means, e.g. a plug and socket arrangement between the plant growth limitation shield 4 and the plant growth chamber sidewall 14, and the like. It is preferred the apparatus be formed from molding as an integral construct.

Figure 7A:
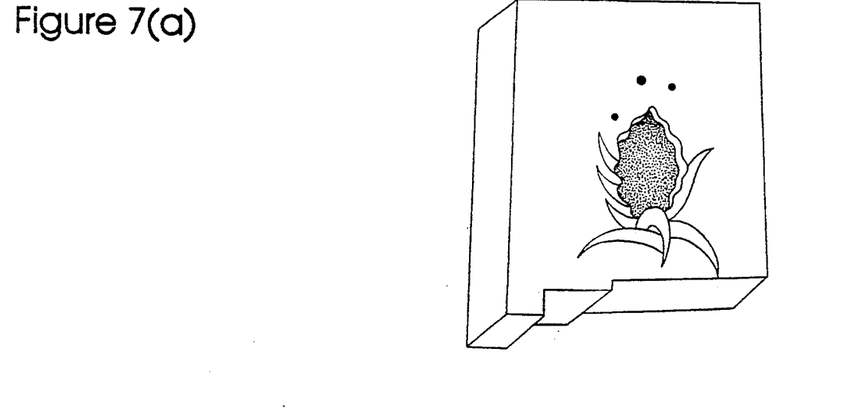
FIGS. 7a–g reflect a method of manufacture.
Figure 7B:
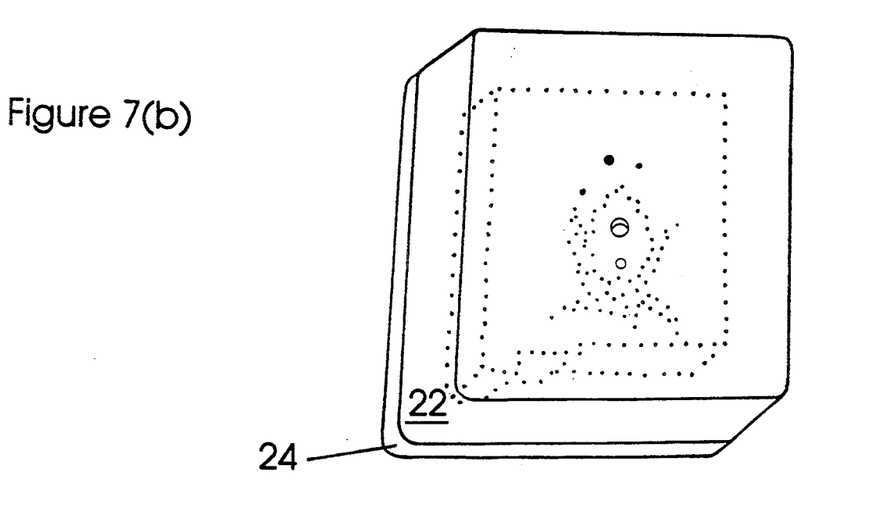
Figure 7C:
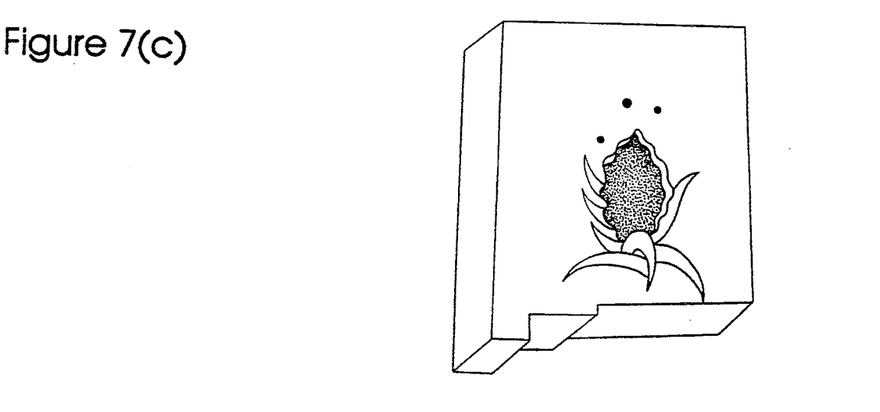
Figure 7D:
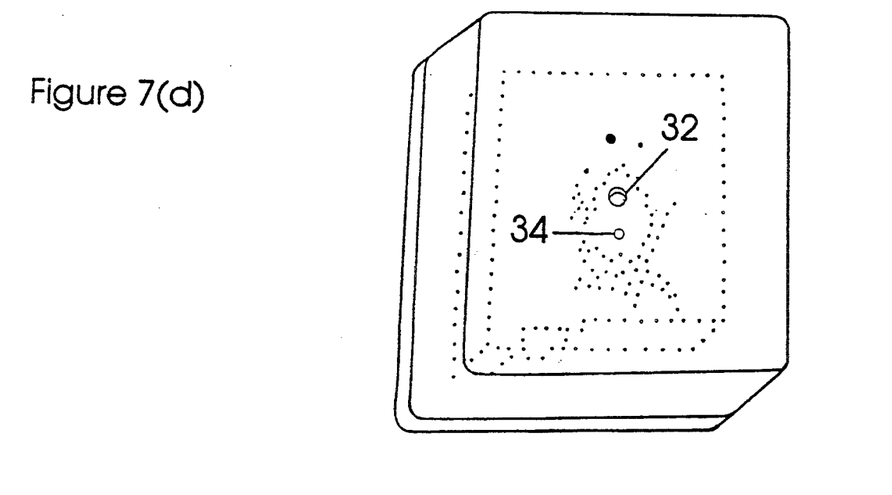
Figure 7E:
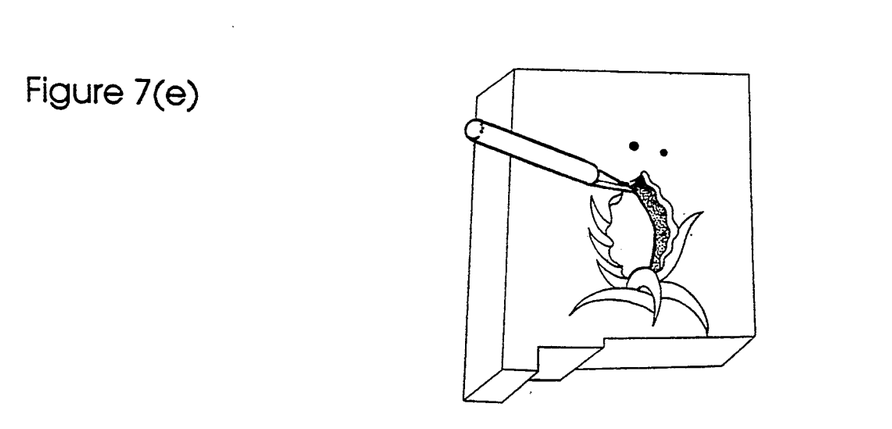

FIGS. 7a–g reflect a preferred method of forming an integral plant growth apparatus by molding. First, a model that mimics the finished article of manufacture is formed perhaps using wood, clay or a combination thereof. Please see FIG. 7a. Note the ultimate opening 6 in the earlier figures is reflected as a bas relief. Next, FIG. 7b reflects a plaster mold ensconcing the model. This mold defines a "female" of the finished article. The plaster female mold is formed from multiple parts: here shown as an upper part 22 and a lower part 24. Separation of the mold allows access to its interior to allow removal of the FIG. 7a model and the formation therein of a dense block (FIG. 7c) formed from stone-like master plaster. This dense block allows fabrication of multiple multi-part plaster production molds (FIG. 7d) which are used to form the finished article of manufacture, shown in FIG. 7e. Notice portal 32 and vent 34. A slurry of terra cotta and water is fed into the production mold. Contact between the slurry and the plaster production mold causes water from the slurry nearest the plaster mold to leach out and form a terra cotta skin thereagainst. Generally the longer the slurry remains in the production mold, the thicker the skin. Ultimately, excess slurry is poured out through portal 32 leaving an enclosed volume defining "greenware". This "greenware" of FIG. 7e is hollow and needs to have the opening 6 cut through and smoothed. Recall the original molds defined the opening as a depression or bas-relief.

Figure 7F:
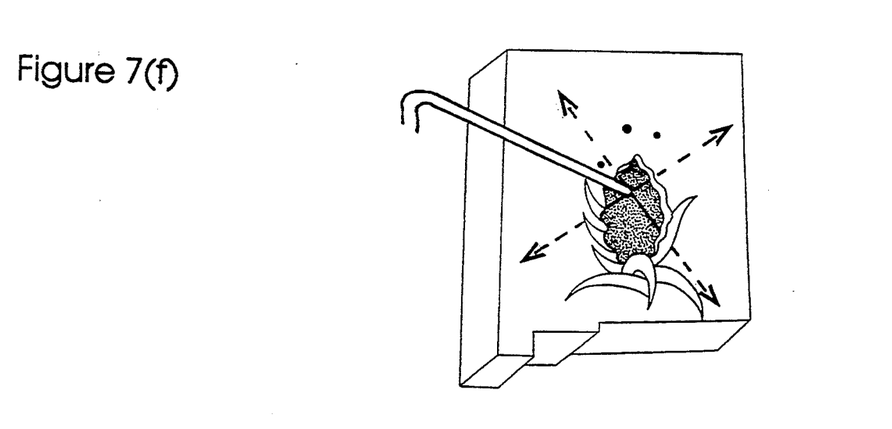
Figure 7G:
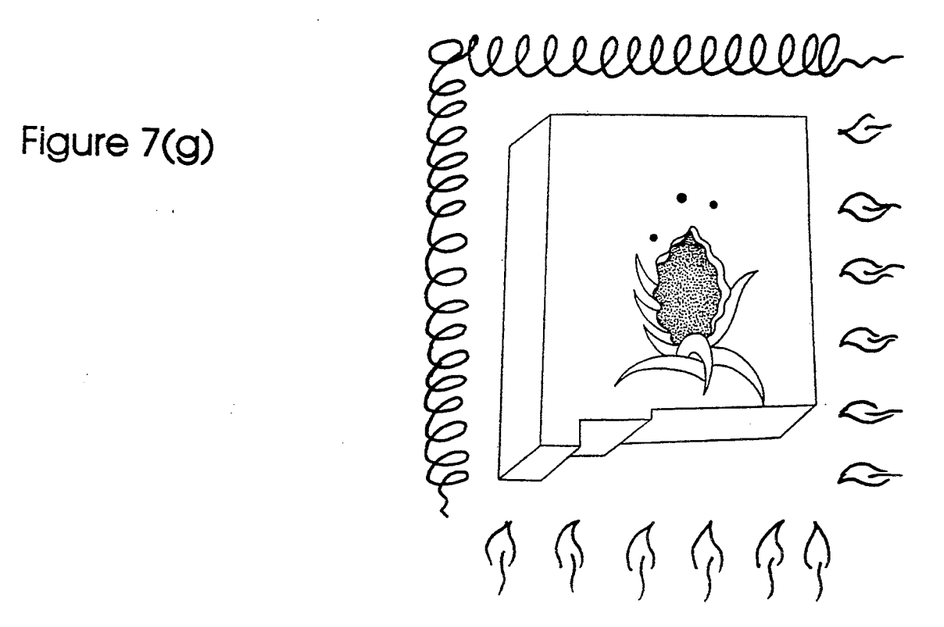

Holes H (FIG. 1 and FIG. 4) are also cut to allow liquid seepage when the device is used as a planter or a hanger support. A spray wand sprays glazing into the interior cavity as shown in FIG. 7f via apertures on the wand. The greenware is then finished in a kiln by firing (FIG. 7g).

The subject invention may be used by filling the plant growth chamber with plant growth media such as soil, hydroponic solution and the like. Seeds of plants of interest are then deposited in plant growth media and allowed to germinate. Holes H allow drainage. It is of particular interest to grow plants that are in some way related to the particular embodiment of the illustration on the plant growth limitation shield or the country, state or continent depicted. For example, an apparatus corresponding to Ireland may be used with shamrock plants. Depictions of the United States (e.g. FIG. 6) may have indicia corresponding to Iowa's used in conjunction with corn seedlings. Thus, seeds germinating in media in the plant growth chamber will grow through, and may fill in, at least in part, the aperture(s) in the plant growth limitation shield. The growing plants may thus provide an educationally reinforcing association between living things and the particular geographical or biological information sought to be communicated by the subject invention. As should now be evident, other endemic flora or fauna could be used as well as other symbols.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. An educational device comprising,
a plant growth chamber;
a substantially planar plant growth limitation shield, having a top and bottom surface, wherein said top surface comprises an illustration, and at least one opening;
said opening including a plant growth sculpting means providing an outline for vegetation extending up through said opening,
a means for holding said shield in fixed position relative to said chamber, wherein the bottom surface of said shield faces said chamber,
wherein said illustration corresponds to a single land mass,
wherein said land mass corresponds to an undivided region comprising at least a part of a continent, and
wherein said opening is configured such that said sculpting means corresponds to a region of vegetation present on the land mass represented by said illustration.

2. The educational device of claim 1 wherein said plant growth chamber is integrally formed with said plant growth limitation shield and includes a base having a peripheral contour paralleling said illustration, and sidewalls extending from said peripheral contour of said base to said shield.

3. A method for educationally correlating at least two criteria and requiring discernment from at least one sense, the steps including:
providing a container with a base and a periphery which correlates with a geographic area, thereby defining a first of said two criteria, and
locating, on a surface of said container and within said periphery, live vegetation corresponding in some way to the geographic area depicted by the periphery of the container, the vegetation defining a second of said two criteria, each of said two criteria thereby exposed for discernment.

4. The method of claim 3 including forming the container as a hollow enclosed volume, the steps including;
forming a model whose periphery defines the first criteria,
molding a female mold over the model,
removing the model from the female mold,
forming a master in the female mold,
removing the master from the female mold,
forming production molds from the master,
forming the container within the production mold,
forming a bas relief in the model,
allowing the bas relief to be reflected in the production mold,
having the portal pass through the bas relief,
trimming the bas relief from the greenware, thereby defining the third criteria, as an opening, the opening sized to allow live vegetation to pass therethrough, and
glazing the greenware and firing the greenware.

5. The method of claim 4 including:
providing a portal in the production mold,
injecting a cementitious slurry therein,
forming a skin within the production mold,
removing excess slurry via the portal, providing greenware.

6. An educational device comprising,
a plant growth chamber;
a substantially planar plant growth limitation shield, having a top and bottom surface, wherein said top surface comprises an illustration, and at least one opening; and
a means for holding said shield in fixed position relative to said chamber, wherein the bottom surface of said shield faces said chamber,
wherein said plant growth chamber and said shield are integrally formed together from terra cotta material.

7. A planter for educating a person as to vegetation representative of a geographic location, comprising in combination:
a planter having a periphery which is contoured to mimic an outline of a geographic area, said planter supporting media which can support live vegetation,
whereby a person viewing said planter will be educated as to which types of vegetation are indigenous to certain geographic areas,
wherein said planter includes a plant growth limitation shield oriented horizontally on an upper surface of said planter., said shield including an opening therein having a peripheral contour corresponding to a feature associateable with the geographic area represented by said periphery of said planter, said opening for having the live vegetation growing upwardly therethrough,
whereby when the vegetation is configured within said planter such that the vegetation would extend through said opening exhibits a contour mimicking said contour of said opening, the vegetation itself may be sculpted to a feature correlating with the geographic area exhibited by said periphery of said planter, wherein said periphery of said planter is isolated from other planters and said shield includes a periphery which terminates adjacent said periphery of said planter, whereby said planter has a periphery which represents only a single geographic area, and wherein said planter and said shield are formed together as a unitary mass and formed from terra cotta opaque materials.

8. The method of claim 4 including the further step of configuring the opening to have a periphery which corresponds to a feature of the geographic area of the first criteria, whereby the container periphery, opening periphery and vegetation provide three criteria interrelated to each other and to a geographic area.

* * * * *